United States Patent
Makey et al.

(10) Patent No.: US 8,856,749 B2
(45) Date of Patent: Oct. 7, 2014

(54) MULTI-PATH BROKERED TEST AUTOMATION EXECUTION

(75) Inventors: Kristopher A. Makey, Kirkland, WA (US); Ryan J. Cavanaugh, Seattle, WA (US); Dmitri A. Klementiev, Redmond, WA (US); Xuechun Li, Redmond, WA (US); Scott Louvau, Redmond, WA (US); Eric I Maino, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 12/891,823

(22) Filed: Sep. 28, 2010

(65) Prior Publication Data

US 2012/0079457 A1 Mar. 29, 2012

(51) Int. Cl.
- G06F 9/44 (2006.01)
- G06F 19/00 (2011.01)
- G06F 11/36 (2006.01)

(52) U.S. Cl.
CPC ................. G06F 11/3688 (2013.01)
USPC ............ 717/126; 717/127; 702/123; 719/328

(58) Field of Classification Search
USPC ....................................................... 717/126
See application file for complete search history.

(56) References Cited

U.S. PATENT DOCUMENTS

| | | | |
|---|---|---|---|
| 6,408,403 B1 | 6/2002 | Rodrigues et al. | |
| 6,662,312 B1 | 12/2003 | Keller et al. | |
| 6,799,147 B1* | 9/2004 | Balasubramanian et al. | 702/186 |
| 7,039,912 B1 | 5/2006 | Moulden, Jr. et al. | |
| 7,231,436 B1 | 6/2007 | Dalfo et al. | |
| 7,457,989 B2 | 11/2008 | Ulrich et al. | |
| 2002/0120918 A1* | 8/2002 | Aizenbud-Reshef et al. | 717/127 |
| 2004/0193616 A1* | 9/2004 | Pharies et al. | 707/100 |
| 2004/0226027 A1* | 11/2004 | Winter | 719/328 |
| 2005/0081106 A1 | 4/2005 | Chang et al. | |
| 2005/0204343 A1 | 9/2005 | Kisamore et al. | |
| 2006/0075302 A1* | 4/2006 | Ulrich et al. | 714/38 |
| 2007/0162894 A1 | 7/2007 | Noller et al. | |

OTHER PUBLICATIONS

Eyhorn, Christopher, "The power of the Dynamic Test List", Retrieved at <<http://blogs.telerik.com/christophereyhorn/posts/10-06-28/the_power_of_the_dynamic_test_list.aspx>>, Jun. 28,2010, pp. 11.

Osenkov, et al., "Using a DSL for Calling APIs to Test Software", U.S. Appl. No. 12/762,371, filed Apr. 19, 2010, pp. 1-18 and Drawing Sheets 1-6.

\* cited by examiner

Primary Examiner — James D Rutten
(74) Attorney, Agent, or Firm — Kevin Sullivan; Kate Drakos; Micky Minhas

(57) ABSTRACT

A test case can be run with actions from the test case being executed in multiple execution paths. This can be done with the aid of an action broker. For example, the broker may identify available automation implementations for the actions and use a priority list to select between available automation implementations for executing an action from the test case. The broker may also perform conversions of results of actions for use by implementations executing other actions in different execution paths, as well as passing results between implementations in different execution paths.

20 Claims, 4 Drawing Sheets

MULTI-PATH BROKERED TEST AUTOMATION EXECUTION

BACKGROUND

In the modern software industry a medium-to-large sized company usually creates not only a large variety of software applications but also many different variations of each application such as different SKUs, localized versions, etc. A vast majority of software applications on the market have Graphical User Interfaces (GUI, or UI).

The quality of shipped applications, including UI-based applications, is typically assured by running automated tests. Currently there are two major approaches for creating such automation: (1) running a test by simulating user input, i.e., driving a UI-based application under test via simulated user input (e.g., mouse and keyboard input) generated programmatically; and (2) running a test by calling internal application programming interfaces (APIs) for the application under test.

SUMMARY

The tools and techniques described herein relate to running a test case with multiple possible execution paths. Execution paths are paths to executing actions, such as an API path, a UI path, etc. This can be done with the aid of a broker, which can be a module that selects automation implementations for executing actions in execution paths. For example, the broker may use a priority list to select between available implementations. A priority list is a data structure that indicates priorities of action execution paths for actions within all or a portion of a test case. For example, a priority list may indicate that for an action an API path is highest priority, and that a UI path is the next highest priority. Accordingly, this would indicate that an automation implementation using the API path is to be used if available, and if not, then an automation implementation using the UI path is to be used. A priority list can also indicate that a failure notice should be raised if no implementations are available for executing in a set of one or more execution paths. An automation implementation for an action is code (e.g., a script, binary code, etc.) that can carry out the action through an execution path, such as by simulating user input or API calls to request that an application being tested perform the action. The broker may also perform conversions of results for use in different paths, as well as passing results between implementations in different paths.

In one embodiment, the tools and techniques can include executing an automated computer test case that indicates a set of actions to be executed. An indication of a first action of the set of actions can be received at an action broker while executing the test case, and the action broker can respond by performing acts that can include the following: choosing a first automation implementation to execute the first action; sending a request to the first automation implementation to execute the first action through a first action execution path; and receiving a result from the execution of the first action through the first action execution path. Additionally, an indication of a second action of the set of actions can be received at the action broker while executing the test case. The action broker can respond by performing acts that can include the following: choosing a second automation implementation to execute the second action; sending a request to the second automation implementation to execute the second action through a second action execution path; and transmitting the result from the execution of the first action to the second automation implementation for use in executing the second action through the second action execution path.

In another embodiment of the tools and techniques, a test case can be configured to indicate one or more actions to be performed in an automated test. A logical layer can include indications of available automation implementations for executing actions through a plurality of action execution paths. A priority list can indicate an execution path priority for one or more of the actions to be performed. Additionally, an action broker can be configured to receive and use information from the test case, the logical layer, and the priority list to perform acts for each of one or more actions during the automated test. If an implementation is available for executing the action, then the acts performed by the action broker can include selecting a chosen implementation for executing the action, and initiating execution of the action using the chosen implementation.

In yet another embodiment of the tools and techniques, an automated computer test case can be executed. The test case can indicate a set of actions to be executed. An indication of a first action of the set of actions can be received at an action broker while executing the test case. The action broker can perform acts in response to receiving the indication of the first action. These acts can include sending a request to execute the first action through a first action execution path using a first automation implementation; receiving a result from the execution of the first action; and converting the result from execution of the first action to an intermediate format from a format that is specific to the first action execution path. An indication of a second action can also be received at the action broker while executing the test case. The action broker can perform acts in response to receiving the indication of the second action. These acts can include sending a request to execute the second action through a second action execution path using a second automation implementation; converting the result from execution of the first action from the intermediate format to a format that is specific to the second action execution path; and passing the result from the execution of the first action to the second automation implementation to be used in executing the second action.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
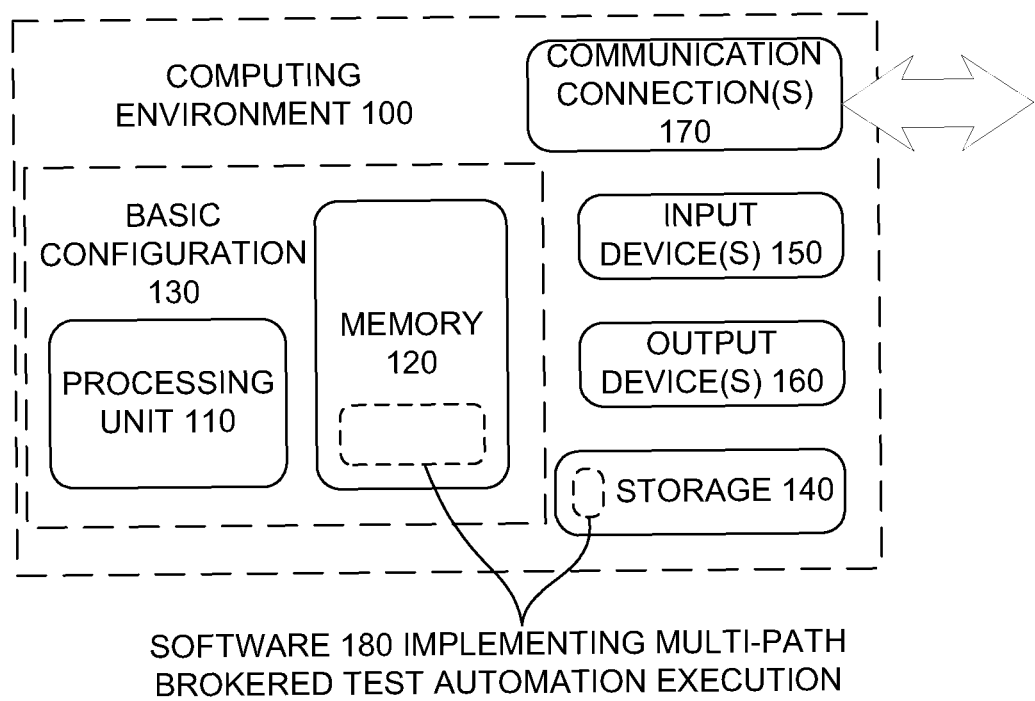
FIG. 1 is a block diagram of a suitable computing environment in which one or more of the described embodiments may be implemented.

Embodiments described herein are directed to techniques and tools for improved software test automation. Such improvements may result from the use of various techniques and tools separately or in combination.

Such techniques and tools may include having a test case that can execute automation actions through a broker. The test case can be written against a logical model. The broker can choose specific implementations of the actions from the test case based on a priority list and availability of implementations. The broker can switch between different execution paths while executing the same test case based on inputs and availability of action implementations. For example, a test may switch from API executed actions to UI executed actions and back to API executed actions. This may include the broker consulting a priority list and selecting an automation implementation for the highest priority path that has an available implementation for executing the action. The broker can also convert results from one path-specific format to another path-specific format to allow results to be communicated between implementations in different execution paths. This can be done without the implementations in different paths being aware of each other, and it may also be done without a test case being aware of what implementations are available.

One or more substantial benefits may be realized from the tools and techniques described herein. For example, a single test case can be created to run via either UI or API (or one or more other implementations) and also can run in the mixed mode so parts of the test defined by a user can be run as UI-level automation (i.e., through one or more UI execution paths) and other parts as API-level automation (i.e., through one or more API execution paths). Additionally, more implementations may be added and used with the test case without the test case and/or existing implementations being rewritten because the test case can run without being aware of what implementations are available, and implementations can run without awareness of other implementations in other execution paths.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as an automated test environment. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing multi-path brokered test automation execution.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Multi-Path Brokered Test Automation Execution System and Environment

Figure 2:
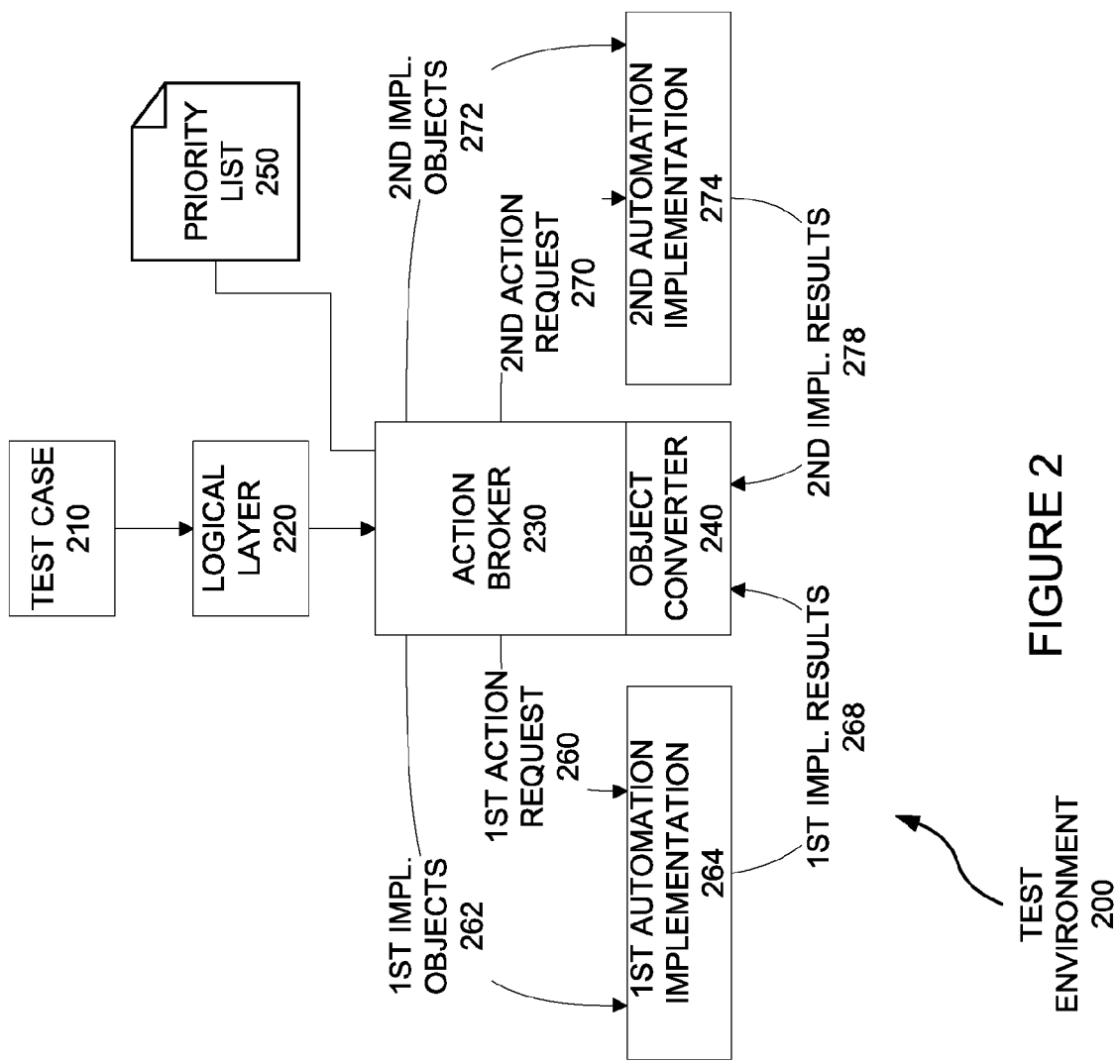
FIG. 2 is a schematic diagram of a test automation execution environment.

FIG. 2 is a block diagram of a test automation execution environment, or test environment (200) in conjunction with which one or more of the described embodiments may be implemented. The test environment (200) can include a test case (210), which can indicate actions to be performed during a test. These indications can be independent of an execution path within which the actions are to be executed. For example, a test case for a word processing application may indicate that a document is to be opened (one action), that text is to be added to the document (a second action), that the document is to be closed (a third action), etc. The test case (210) can indicate such actions without indicating whether the actions are to be executed through a UI path, an API path, or through some other execution path.

The test environment (200) can also include a logical layer (220), which can include action implementations (the code for executing the actions through particular execution paths). For example, the logical layer (220) may be a library, such as one or more *.dll files that include the implementations for the actions.

An action broker (230) can receive indications from the test case (210) of actions to be performed, can select implementations from the logical layer (220) to perform those actions, and can request that the implementations perform the actions. An object converter (240), which may be part of the action broker (230), can convert results of the implementations between different formats to facilitate communication of results between implementations using different execution paths. Additionally, the action broker (230) can use a priority list (250) of execution paths to determine which available implementation to invoke if there are multiple available implementations using different execution paths. The priority list (250) may be provided by a user that develops the test case (210), which may itself be a program that executes to perform a software test. The priority list (250) may take various forms, such as a listing in an API call for executing the test case (210). The priorities for the priority list (250) may be indicated at one or more of various levels of granularity (e.g., per action, per batch of tests, per feature (editor, debugger, project, etc.)). The same test case (210) could be used with different priority lists (250), such as using different priority lists on a periodic bases, etc.

As an example, the test case (210) may indicate to the action broker (230) that a first action is to be executed. The action broker (230) can search the logical layer (220) to determine what implementations are available to execute the action, and which execution paths those implementations use. For example, the test case (210) may indicate an action to be executed, and the action broker (230) may search the logical layer (220) for implementations that match that action (e.g., by searching through one or more *.dll files in the logical layer (220)).

The action broker (230) can use the priority list (250) to determine which implementation to invoke if multiple implementations are available. For example, the priority list (250) may indicate that a UI path is the highest priority, and if no implementation is available for the UI path, then an API path is the next highest priority, and if no implementation is available for either of these paths then the action is not to be performed (resulting in a failure notice such as an error routine, and exception routine, etc.). The priority list (250) may indicate other priorities, such as having and API path be the highest priority, having different priorities for different UI paths (keyboard entry, buttons, menus, dialogs, etc.), having one highest priority path and indicating failure if no implementation is available for that path, etc. Also, the priority list (250) may indicate overall priorities for the whole test case (210) and/or specific priorities for an action or group of actions in the test case (210). If the priority list (250) includes overall priorities and more specific priorities, then the more specific priorities may override the overall priorities for the action or group of actions to which the specific priorities apply. Additionally, the priority list may take different forms, and may be communicated to the action broker (230) in different ways. For example, the priority list (250) may be communicated to the action broker (230) by the test case (210).

As an example, the test case (210) can be a program, the priority list (250) can be information that is communicated to the test case (210), and the test case (210) can communicate that information to the action broker (230). Indeed, the priority list (250) may be part of the test case (210), although it will often be separate from the test case (210).

Referring still to FIG. 2, the action broker (230) can switch between different execution paths during a test, and can convert action results to formats that are useable by implementations in different execution paths. For example, the action broker (230) may send a first action request (260) and first implementation objects (262), i.e., objects that are formatted to be used by a first automation implementation (264), to the first automation implementation (264). For example, this may be done by the action broker (230) making a call to the first automation implementation (264). The first automation implementation (264) can be code (e.g., binary code) that is configured to run the requested action through a first execution path. The first automation implementation (264) can return first implementation results (268), which can be objects returned from running the action. The first implementation results (268) can be returned in a format that is specific to the first execution path. However, the object converter (240) may convert the first implementation results (268) into a format that can be used by a different execution path. For example, the object converter (240) may serialize the results (e.g., using serialization available in the Microsoft® .NET framework) into an intermediate format such as a standard format that can be stored, and the object converter may then convert the intermediate format into a format that can be used by another execution path, such as a format that is specific to the other execution path. The intermediate format can include information that is sufficient for the object converter (240) to construct a format that is useable in the different execution paths. For example, a UI execution path may use a window identifier, while such an identifier may not be needed for an API execution path. Accordingly, the intermediate format may or may not include the window identifier, but it can have information that can be used to get the window identifier if the intermediate format is to be converted to a format for use in the UI execution path.

The action broker (230) may send a second action request (270) along with second implementation objects (272) to a second automation implementation (274) that can be configured to execute actions in software being tested in a second execution path. Accordingly, the second implementation objects (272) can be converted by the object converter (240) into a format that can be used by the second automation implementation (274), such as a format that is specific to the second execution path. For example, the second implementation objects (272) may include the first implementation results (268) (but converted into the format to be used by the second execution path). The second automation implementation (274) can also communicate the second implementation results (278) to the object converter (240) in a format that can be used by the second execution path. The object converter (240) can convert the second implementation results (278) into the intermediate format. Accordingly, a test executing in the test environment (200) can switch between a first execution path and a second execution path.

A test executed in the test environment (200) can be a set of actions that is the logical union of the actions from implementations that execute actions through multiple execution paths. Consider the following example: There is a set of actions {A, B, C} implemented in a UI automation framework so that {A, B, C} can be executed in a UI execution path with one set of implementations. Additionally, there is a set of actions {B, C, D} implemented in API automation framework so that {B, C, D} can be executed in an API execution path with another set of implementations. A test case (210) can include the set of actions {A, B, C, D} to be executed in the test environment (200). During an execution A is executed in the UI path, B and C can be executed by either path (determined using the priority list (250)) and D is executed via the API path.

As discussed above, the action broker (230) can handle conversion of results, such as serialization of objects that are inputs and output from actions, using an object converter (240) to allow communication between implementations when switching execution paths during execution of the test case (210). In the example previously mentioned where actions {A, B, C} are implemented in a UI framework and actions {B, C, D} are implemented in an API framework, imagine that the 'B' action produces output that is to be input into the 'C' action. The input/output information of these actions is generally similar, but not the same, between implementations. In the test environment (200), Action B could be executed in the UI path and action C could be executed in the API path because the output results can be converted through the broker to allow communication across implementations. This can be done without actions B and C executing in the same execution path, and without the implementation of action B having an awareness of other implementations of action C.

In summary, the test environment (200) can be a computer system that can include a number of components. These components can include the test case (210) configured to indicate one or more actions to be performed in an automated test. The components can also include the logical layer (220) including indications of available automation implementations (264, 274) for executing actions through a plurality of action execution paths. The components can also include the priority list (250) indicating an execution path priority for one or more of the actions to be performed. Additionally, the components can include the action broker (230), which can be configured to receive and use information from the test case (210), the logical layer (220), and the priority list (250) to perform acts for each of the one or more actions during the automated test. If an implementation is available for executing the action, these acts of the action broker (230) can include selecting a chosen implementation for executing the action, and initiating execution of the action using the chosen implementation.

Selecting a chosen implementation can include checking availability of automation implementations for one or more execution paths on the priority list, as well as identifying an implementation as the chosen implementation if the implementation is for a highest priority execution path on the priority list that has an available implementation for the action.

If no implementations are available for any of the one or more execution paths on the priority list, then an implementation can be considered not available for executing the action, and the action broker (230) can be configured to raise a failure notice. For example, this may be done by one or more of various different kinds of notifications, error warnings, exception handling routines, error routines, etc.

Additionally, the action broker (230) can be configured to switch between multiple automation implementations (264, 274) for multiple execution paths during an automated test. The action broker (230) can also be configured to convey communications (e.g., results (268, 278) and implementation objects (262, 272)) between the multiple automation implementations (264, 274) during the automated test without the multiple automation implementations (264, 274) being aware of each other. The test environment (200) can be configured in this manner without the test case (210) relying on having an awareness of what automation implementations are available.

III. Multi-Path Brokered Test Automation Execution Techniques

Several multi-path brokered test automation execution techniques will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
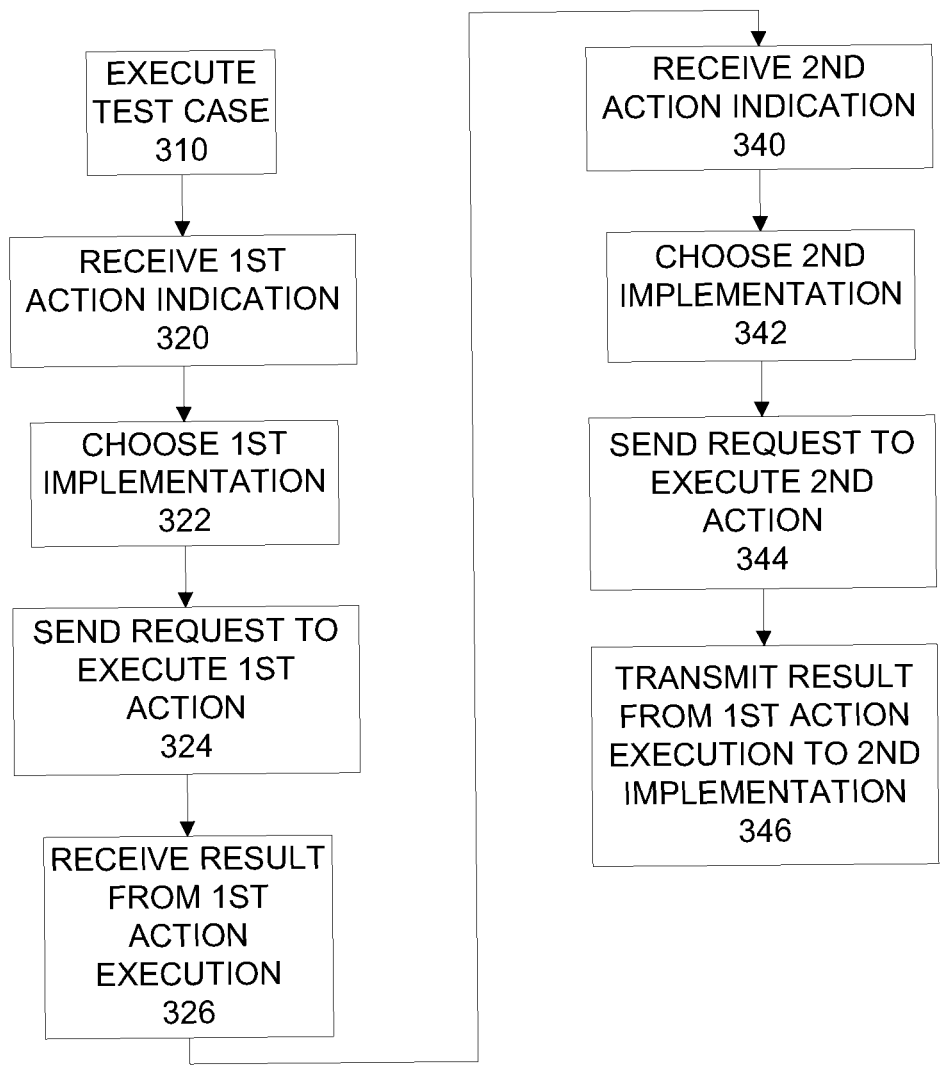
FIG. 3 is a flowchart of a multi-path brokered test automation execution technique.

Referring to FIG. 3, a multi-path brokered test automation execution technique will be discussed. The technique can include executing (310) an automated computer test case that indicates a set of actions to be executed. An indication of a first action of the set can be received (320) at an action broker while executing the test case. The action broker can perform acts in response to receiving (320) the indication of the first action. These acts can include choosing (322) a first automation implementation to execute the first action. For example, choosing (322) can include using a priority list indicating one or more action execution paths for the first action, as well as determining availability of one or more automation implementations for executing the first action through one or more action execution paths indicated by the priority list. The acts can also include sending (324) a request to the first automation implementation to execute the first action through a first action execution path. In addition, the acts can include receiving (326) a result from the execution of the first action through the first action execution path.

The technique of FIG. 3 can also include receiving (340) an indication of a second action of the set of actions at the action broker while executing the test case. The action broker can perform acts in response to receiving (340) the indication of the second action. These acts can include choosing (342) a second automation implementation to execute the second action. The acts can also include sending (344) a request to the second automation implementation to execute the second action through a second action execution path. Additionally, the acts can include transmitting (346) the result from the execution of the first action to the second automation implementation for use in executing the second action through the second action execution path.

In the technique of FIG. 3, the first action execution path can be a user interface execution path and the second action execution path can be an application programming interface execution path. Also, the first automation implementation may not rely on having an awareness of the second automation implementation, and the second automation implementation my not rely on having an awareness of the first automation implementation. Additionally, the test case may not rely on having an awareness of what automation implementations are available. Accordingly, the test case can be implementation-independent, and can continue to operate and utilize implementations as they become available or discontinue using them if they become unavailable. This does not preclude having a priority list within the test case, or such a priority list specifying that a failure notification be issued if an implementation for a specified execution path is not available.

The technique can also include converting the result from the execution of the first action from a format that is specific to the first action execution path to a format that is specific to the second action execution path. This conversion may include converting the result from the format that is specific to the first action execution path to a format that is not specific to the first action execution path or the second action execution path. The conversion can also include converting the result from the format that is not specific to the first action execution path or second action execution path to a format that is specific to the second action execution path.

Additionally, the result from execution of the first action can be a first result and the method can further include receiving a second result from the execution of the second action in a format that is specific to the second action execution path. The technique can include converting the second result to the format that is not specific to the first action execution path or the second action execution path from the format that is specific to the second action execution path. Additionally, the technique can include saving the first result in the format that is not specific to the first action execution path or second action execution path, and saving the second result in the format that is not specific to the first action execution path or the second action execution path.

Figure 4:
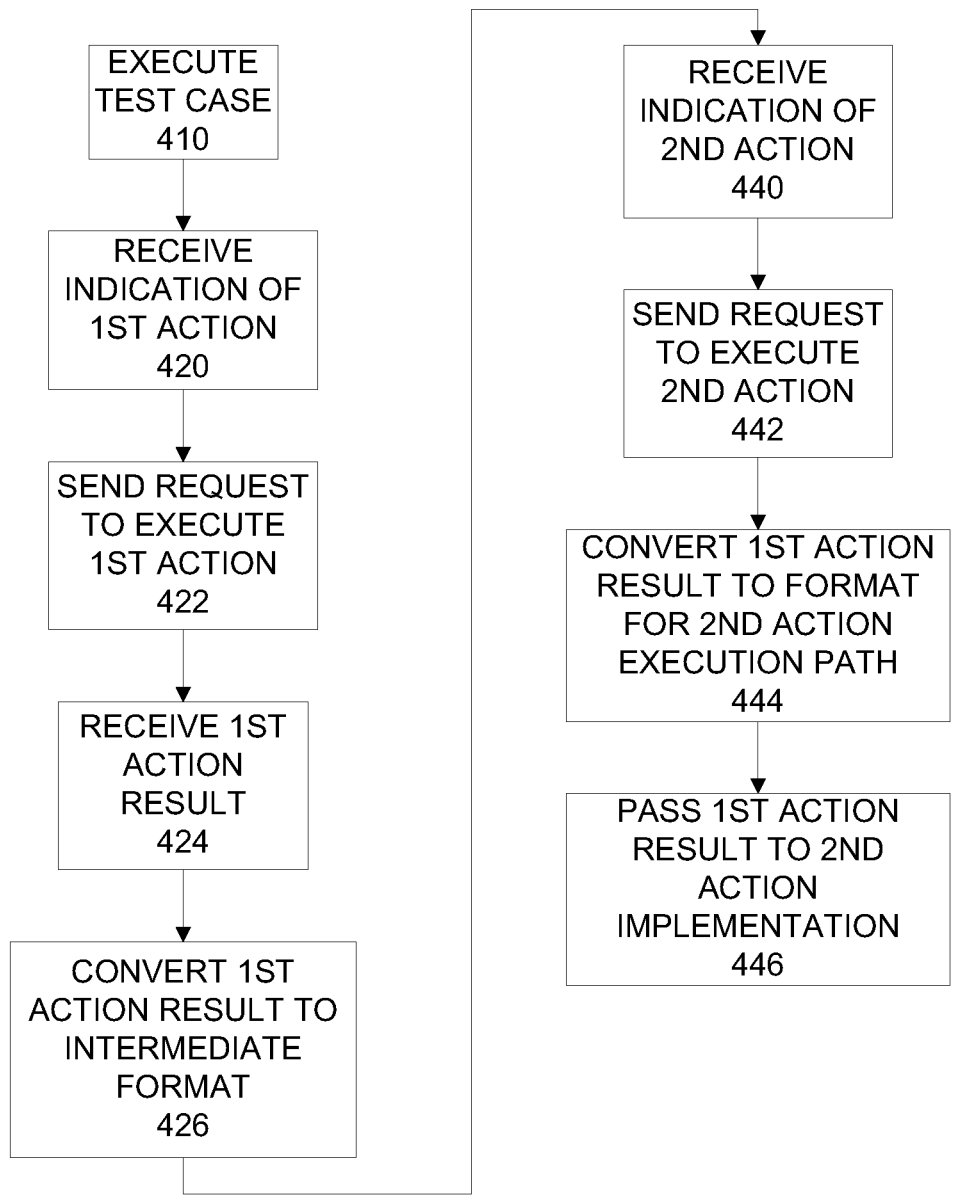
FIG. 4 is a flowchart of another multi-path brokered test automation execution technique.

Referring to FIG. 4, another multi-path brokered test automation execution technique will be discussed. The technique can include executing (410) an automated computer test case that indicates a set of actions to be executed. The technique can also include receiving (420) an indication of a first action of the set of actions at an action broker while executing the test case. The action broker can perform acts in response to receiving the indication of the first actions. These acts can include sending (422) a request to execute the first action through a first action execution path using a first automation implementation. The acts can also include receiving (424) a result from the execution of the first action, and converting (426) the result from execution of the first action to an intermediate format from a format that is specific to the first action execution path.

The technique can also include receiving (440) an indication of a second action of the set of actions at the action broker while executing the test case. The action broker can perform acts in response to receiving the indication. The acts can include sending (442) a request to execute the second action through a second action execution path using a second automation implementation. Additionally, the acts can include converting (444) the result from execution of the first action from the intermediate format to a format that is specific to the second action execution path, and passing (446) the result from the execution of the first action to the second automation implementation to be used in executing the second action.

The technique of FIG. 4 can include selecting the first and second automation implementations using an execution path priority list. Additionally, the FIG. 4 technique can be performed without the first automation implementation relying on having an awareness of the second automation implementation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
executing an automated computer test case that indicates a set of actions to be executed;
receiving an indication of a first action of the set of actions at an action broker, the action broker performing the following acts in response to receiving the indication of the first action:
choosing a first automation implementation to execute the first action;
sending a request to the first automation implementation to execute the first action through a first action execution path by communicating with software being tested, the execution of the first action by the first automation implementation through the first action execution path comprising using the first action execution path to request that the software being tested perform the first action; and receiving a result from the execution of the first action by communicating with the software being tested through the first action execution path, the result from the execution of the first action being received in a format that is specific to the first action execution path; and receiving an indication of a second action of the set of actions at the action broker, the action broker performing the following acts in response to receiving the indication of the second action:

choosing a second automation implementation to execute the second action;

sending a request to the second automation implementation to execute the second action through a second action execution path that is different from the first action execution path by communicating with software being tested, the execution of the second action by the second automation implementation through the second action execution path comprising using the second action execution path to request that the software being tested perform the second action, the second action being different from the first action, and the second automation implementation being different from the first automation implementation; and transmitting the result from the execution of the first action to the second automation implementation for use in executing the second action by communicating with the software being tested through the second action execution path, the result from the execution of the first action through the first action execution path being transmitted to the second automaton implementation in a second format that is specific to the second action execution path.

2. The method of claim 1, wherein the first action execution path is a user interface execution path and the second action execution path is an application programming interface execution path.

3. The method of claim 1, wherein choosing the first automation implementation comprises:

using a priority list indicating one or more action execution paths for the first action; and determining availability of one or more automation implementations for executing the first action through one or more action execution paths indicated by the priority list.

4. The method of claim 1, wherein the first automation implementation does not rely on having an awareness of the second automation implementation and the second automation implementation does not rely on having an awareness of the first automation implementation.

5. The method of claim 1, wherein the test case does not rely on having an awareness of what automation implementations are available.

6. The method of claim 1, further comprising converting the result from the execution of the first action from the format that is specific to the first action execution path to the format that is specific to the second action execution path, wherein converting the result comprises:

converting the result from the format that is specific to the first action execution path to a format that is not specific to the first action execution path or the second action execution path; and converting the result from the format that is not specific to the first action execution path or second action execution path to the format that is specific to the second action execution path.

7. The method of claim 6, wherein the result from the execution of the first action is a first result and wherein the method further comprises receiving a second result from the execution of the second action in the format that is specific to the second action execution path.

8. The method of claim 7, wherein the method further comprises converting the second result to the format that is not specific to the first action execution path or second action execution path from the format that is specific to the second action execution path.

9. The method of claim 8, further comprising:

saving the first result in the format that is not specific to the first action execution path or second action execution path; and saving the second result in the format that is not specific to the first action execution path or the second action execution path.

10. The method of claim 9, wherein:

the first action execution path is a user interface execution path and the second action execution path is an application programming interface execution path;

choosing the first automation implementation comprises using a priority list indicating one or more action execution paths for the first action and determining availability of one or more automation implementations for executing the first action through one or more action execution paths indicated by the priority list;

the first automation implementation does not rely on having an awareness of the second automation implementation, and the second automation implementation does not rely on having an awareness of the first automation implementation; and the test case does not rely on having an awareness of what automation implementations are available.

11. One or more computer-readable storage media having computer-executable instructions embodied thereon that, when executed by at least one processor, cause the at least one processor to perform acts comprising:

executing an automated computer test case that indicates a set of actions to be executed;

receiving an indication of a first action of the set of actions at an action broker, the action broker performing the following acts in response to receiving the indication of the first action:

sending a request to execute the first action through a first action execution path using a first automation implementation by communicating with software being tested, the execution of the first action using the first automation implementation through the first action execution path comprising using the first action execution path to request that the software being tested perform the first action; and receiving a result from the execution of the first action in a format that is specific to the first action execution path; and receiving an indication of a second action of the set of actions at the action broker, the action broker performing the following acts in response to receiving the indication of the second action:

sending a request to execute the second action through a second action execution path using a second automation implementation by communicating with software being tested, the execution of the second action by the second automation implementation through the second action execution path comprising using the second action execution path to request that the software being tested perform the second action, the second action being different from the first action, the second automation implementation being different from the first automation implementation, and the second action execution path being different from the first action execution path;
converting the result from execution of the first action to a format that is specific to the second action execution path; and
passing the result from the execution of the first action to the second automation implementation to be used in executing the second action.

12. The one or more computer-readable storage media of claim 11, further comprising selecting the first automation implementation and the second automation implementation using an execution path priority list.

13. The one or more computer-readable storage media of claim 11, wherein the first automation implementation does not rely on having an awareness of the second automation implementation.

14. A computer system comprising:
at least one processor; and
memory comprising instructions stored thereon that when executed by at least one processor cause at least one processor to perform acts comprising:
executing an automated computer test case that indicates a set of actions to be executed;
receiving an indication of a first action of the set of actions at an action broker, the action broker performing the following in response to receiving the indication of the first action:
choosing a first automation implementation to execute the first action;
sending a request to the first automation implementation to execute the first action through a first action execution path by communicating with software being tested, the execution of the first action by the first automation implementation through the first action execution path comprising using the first action execution path to request that the software being tested perform the first action; and
receiving a result from the execution of the first action by communicating with the software being tested through the first action execution path, the result from the execution of the first action being received in a format that is specific to the first action execution path; and
receiving an indication of a second action of the set of actions at the action broker, the action broker performing the following in response to receiving the indication of the second action:
choosing a second automation implementation to execute the second action;
sending a request to the second automation implementation to execute the second action through a second action execution path that is different from the first action execution path by communicating with software being tested, the execution of the second action by the second automation implementation through the second action execution path comprising using the second action execution path to request that the software being tested perform the second action, the second action being different from the first action, and the second automation implementation being different from the first automation implementation; and
transmitting the result from the execution of the first action to the second automation implementation for use in executing the second action by communicating with the software being tested through the second action execution path, the result from the execution of the first action being transmitted to the second automaton implementation in a second format that is specific to the second action execution path.

15. The computer system of claim 14, wherein the first action execution path is an application programming interface execution path and the second action execution path is a user interface execution path.

16. The computer system of claim 14, wherein choosing the first automation implementation comprises: using a priority list indicating one or more action execution paths for the first action; and determining availability of one or more automation implementations for executing the first action through one or more action execution paths indicated by the priority list.

17. The computer system of claim 14, wherein the first automation implementation does not rely on having an awareness of the second automation implementation and the second automation implementation does not rely on having an awareness of the first automation implementation.

18. The computer system of claim 14, wherein the test case does not rely on having an awareness of what automation implementations are available.

19. The computer system of claim 14, wherein the acts further comprise converting the result from the execution of the first action from the format that is specific to the first action execution path to the format that is specific to the second action execution path, wherein converting the result comprises:
converting the result from the format that is specific to the first action execution path to a format that is not specific to the first action execution path or the second action execution path; and
converting the result from the format that is not specific to the first action execution path or second action execution path to the format that is specific to the second action execution path.

20. The computer system of claim 19, wherein the result from the execution of the first action is a first result and wherein the acts further comprise receiving a second result from the execution of the second action in the format that is specific to the second action execution path.

* * * * *